United States Patent [19]
Sheriff

[11] Patent Number: 4,886,014
[45] Date of Patent: Dec. 12, 1989

[54] PET LITTER BOX

[76] Inventor: David G. Sheriff, 49 Ogden La., Rockledge, Fla. 32955

[21] Appl. No.: 235,615

[22] Filed: Aug. 24, 1988

[51] Int. Cl.⁴ .............................................. A01K 29/00
[52] U.S. Cl. ........................................ 119/1; 209/235; 209/260; 209/374; 209/417
[58] Field of Search ..................... 119/1; 209/235, 259, 209/260, 370, 374, 417

[56] References Cited

U.S. PATENT DOCUMENTS

| | | | |
|---|---|---|---|
| 579,646 | 3/1897 | Johnson et al. | 209/259 X |
| 3,908,597 | 9/1975 | Taylor | 119/1 |
| 4,096,827 | 6/1978 | Cotter | 119/1 |
| 4,190,525 | 2/1980 | Menzel | 119/1 X |
| 4,325,822 | 4/1982 | Miller | 209/374 X |
| 4,327,667 | 5/1982 | Bilak | 119/1 |
| 4,602,593 | 7/1986 | Gross | 119/1 |
| 4,616,598 | 10/1986 | Burniski et al. | 119/1 |

FOREIGN PATENT DOCUMENTS 2180732  4/1987  United Kingdom ................... 119/1

*Primary Examiner*—Richard J. Apley
*Assistant Examiner*—Robert W. Bahr

[57] ABSTRACT

This invention is a simple, easy to use, self-cleaning pet litter box that separates reusable litter material from solid pet droppings. This task is accomplished through the use of swelled-out chutes strategically formed along the litter box walls combined with a trough-shaped, wire mesh separator that is also built into the litter box. A hole is cut in the side wall adjacent to the wire separator with a tubular-shaped protrusion extending from the outside of this hole in the wall. By using a tilting, rotating motion, the used litter is passed through the chutes in the walls and into the wire mesh separator. The solid pet waste is trapped in the separator while the still usable litter is filtered through. With one final tilt, the solid waste is dumped through the hole in the wall, through the tubular protrusion, and into an attached disposable plastic bag. This bag connects to the tubular protrusion in such a manner that the bag seals-off and prevents the escape of unpleasant odors, thus allowing several litter cleaning cycles between bag changes.

7 Claims, 2 Drawing Sheets

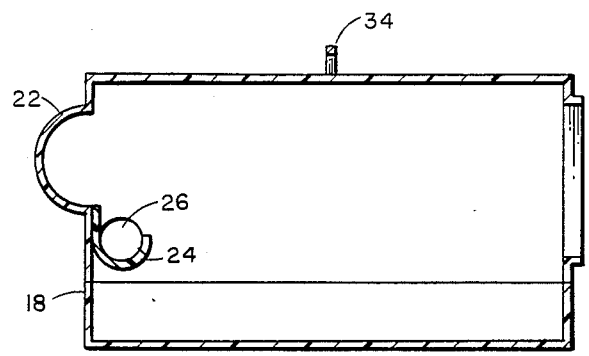
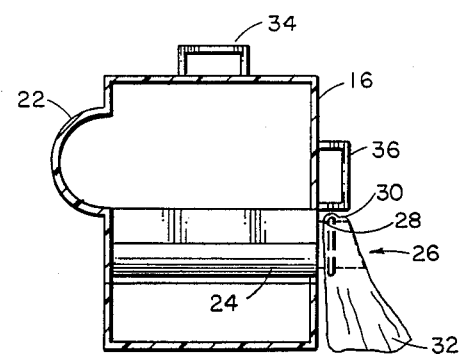
FIG. 3
FIG. 4
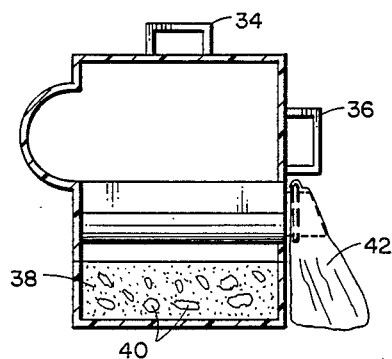
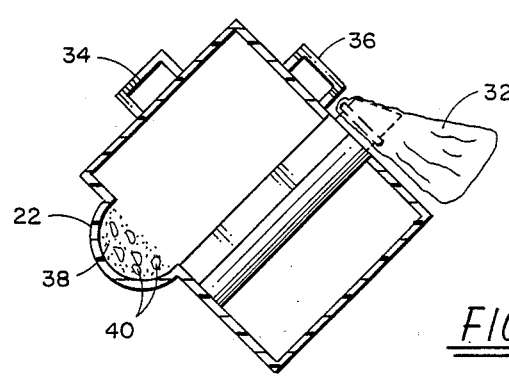
FIG. 5
FIG. 6
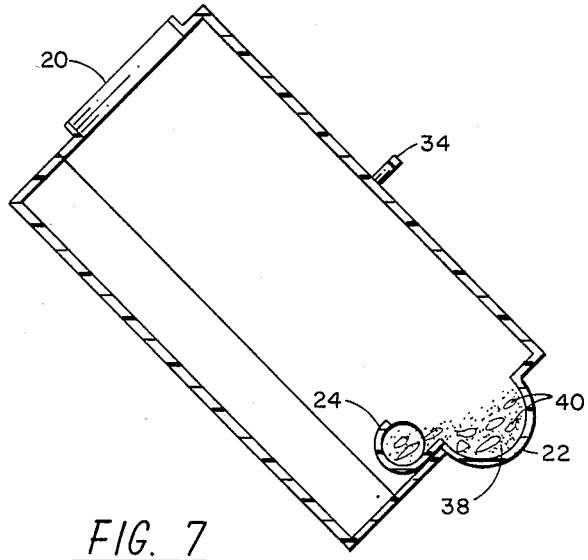
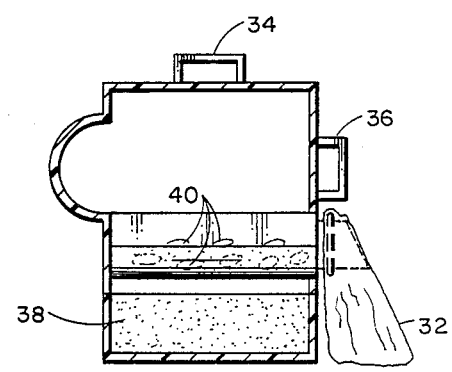
FIG. 7
FIG. 8
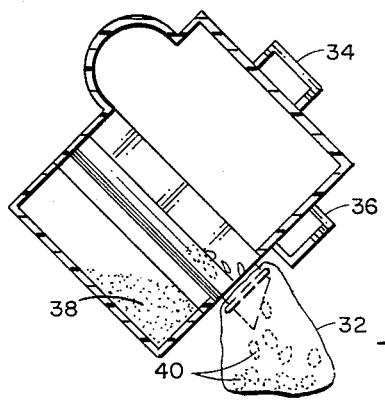
FIG. 9

PET LITTER BOX

BACKGROUND

One of the most unpleasant aspects of owning small indoor pets, such as cats, is the cleaning of pet excrement from liter boxes. These litter boxes are containers that are filled with granular pellets that cover and absorb animal waste left when pets relieve themselves within the box. Litter boxes require regular and thorough cleaning in order to prevent an unhealthy environment for both the pet and the homeowner. The frequent cleaning of these boxes also limits the possibility of pet excrement being picked up on the pet's feet and tracked through the home. A cat is the most common pet to use a litter box. With a cat, there is also the problem of the cat scattering the soiled litter from the box in an attempt to create clean areas in the box to relieve themselves. The failure of the owner to regularly clean the boxes results in very unpleasant odors and eventually the pet will cease to use the box altogether.

The pet owner usually maintains a clean litter box by either of two methods. One method is by frequently changing out all the litter in the box each time the box is cleaned. The other method is by removing only the solid excrement and allowing the litter in the box to absorb the pet urine until the litter becomes saturated. Then all the litter is finally disposed of. By removing the solid excrement and not disposing of the entire box of litter, the pet owner can still adequately maintain a clean and acceptable litter box and at the same time, enjoy a considerable cost savings over the first method.

There are several patents that have disclosed various approaches for separating the sold excrement left in the litter box from the litter itself. These devices usually take advantage of the fact that the litter particles are considerably smaller then the solid pet waste. Therefore, separation can be achieved by having the litter fall through some type of perforations that are sized to be large enough to let the litter pass through easily and yet small enough to retain the solid excrement. Examples include: U.S. Pat. No. 4,325,325 to Larter, which is comprised of two matching interconnecting litter boxes and a removable, perforated, separator plate that is placed between the boxes. Upon inverting the boxes, the separator removes the solid excrement from the first container by allowing only the "cleansed" litter to flow through the perforated plate and into the second container. The solid excrement is then disposed of from the perforated plate. Another example is U.S. Pat. No. 3,908,597 to Taylor, having double boxes with perforated bottoms and a slide-out solid divider. Removing the slide-out divider allows the "cleansed" litter to flow from one container to the other, at which point the top container is removed and the solid excrement disposed of. The top container is then replaced with a cap and the whole stack inverted to repeat the process. Other patents such as U.S. Pat. Nos. 4,602,593 to Gross, and 4,616,598 to Burniski, reveal improvements in cleaning litter boxes that incorporate novel means for opening and closing perforations in a previously solid floor. This allows the litter to sift through while trapping the solid pet excrement. Both of these patents incorporate movable parts activated by handles, cranks, or levers.

There still remains a need for a litter box that is truly simple and easily operated with minimal effort by even the sick, handicapped, or elderly. This box should not require the use of moving parts that can break, wear out, demand maintenance or incorporate additional components that must be stored separately and cleaned after each use. This desired litter box should also allow the owner to dispose of the removed solid pet excrement in a manner that is aesthetically appealing by not requiring the operator to have direct visual or olfactory contact with the pet excrement. Above all else, the litter box must be convenient and safe for the pet to use.

SUMMARY OF THE INVENTION

It is therefore the goal of this invention to provide an apparatus that is a simple, easy to use, and efficient means of separating solid pet excrement from the litter that contained it. Since the litter is not disposed of with each cleaning, this invention would allow a considerable cost savings over other existing devices that require the disposal of the litter as well as the solid pet excrement.

Another object of the invention is to provide an apparatus that would allow for the separation of the solid pet excrement is a manner that is aesthetically acceptable by not requiring direct visual or olfactory contact with the solid excrement.

Still another desire of this invention is to provide an apparatus that allows for the limited sanitary storage of solid pet excrement and therefore encourages more frequent cleaning of the litter box since disposal of the pet excrement is not required for each cleaning cycle.

The final objective of this invention is to provide an apparatus that is able to perform all aspects of the separation process without moving hardware or the use of additional components that must be stored and cleaned after each use.

BRIEF DESCRIPTION OF THE DRAWINGS

The realization of these objectives and the advantages of my invention will be more fully understood in the following detailed description with the accompanying drawings in which:

FIG. 3 is a longitudinal section taken along line 3—3 of FIG. 1;

FIG. 4 is a lateral sectional taken along line 4—4 of FIG. 1;

FIG. 5 is a lateral sectional view taken along line 4—4 of FIG. 1 showing the condition of the litter box components at the initial stage in the litter box cleaning process;

FIG. 6 is a lateral sectional view taken along line 4—4 of FIG. 1 showing the condition of the litter box components at a sequential stage after that of FIG. 5 in the litter box cleaning process;

FIG. 7 is a longitudinal sectional view along line 3—3 of FIG. 1 showing the condition of the litter box components at a sequential stage after that of FIG. 6 in the litter box cleaning process;

FIG. 8 is a lateral sectional view along line 4—4 of FIG. 1 showing the condition of the litter box components at a sequential stage after that of FIG. 7;

FIG. 9 is a lateral sectional view along line 4—4 of FIG. 1 showing the condition of the litter box components at a sequential stage after FIG. 8;

DETAILED DESCRIPTION OF THE PREFERRED EMBODIMENT

Figure 1:
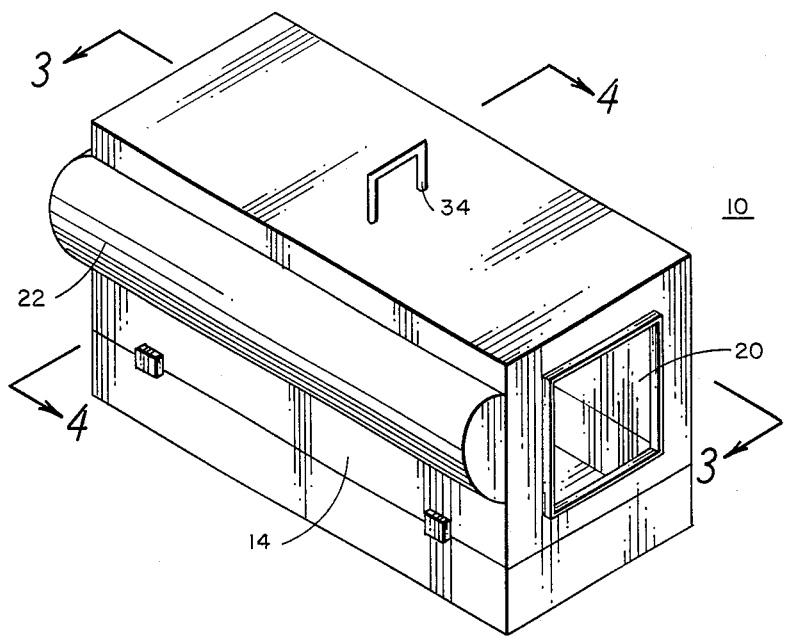
FIG. 1 is a perspective view showing the self cleaning litter box for pets constructed in accordance with this invention.
Figure 2:
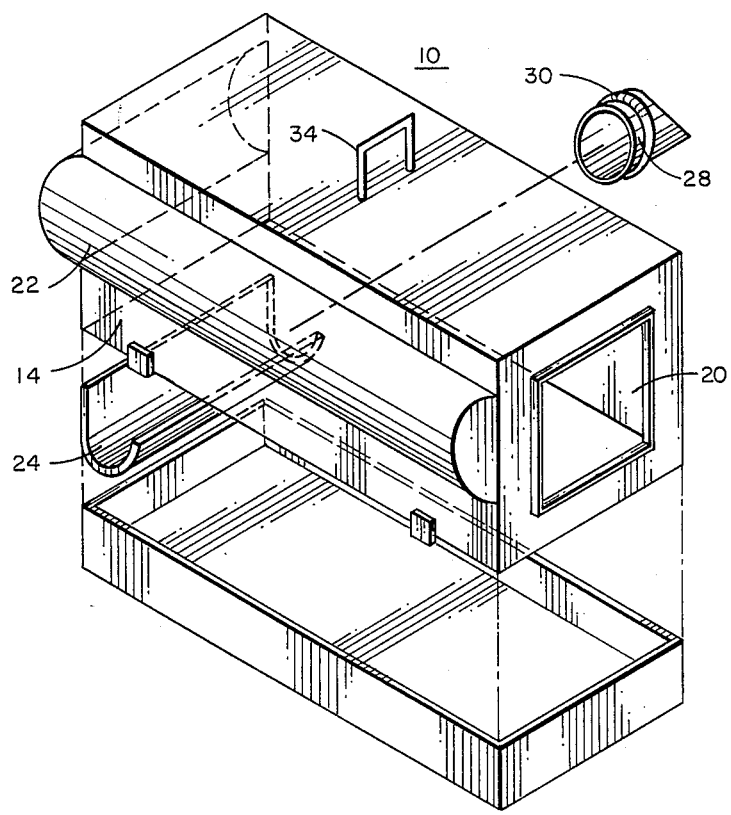
FIG. 2 is an exploded perspective view showing all the relevant components and features of the self cleaning litter box shown in FIG. 1.

As shown in FIGS. 1, 2, 3, and 4, the preferred embodiment of the invention 10 has a basic rectangular pet litter box shape. The inventive device 10 may be constructed from any of numerous materials well known in the art including plastics or metals. In the preferred embodiment, the device is made of injection molded plastic that would be easy to clean and maintain and could be conveniently formed into the novel shape desired. The unique aspects of this shape include the two side walls 14, 16 and the back wall 18 being considerably higher than the lower front pet entrance way 20. The left side wall 14 and the rear wall 18 have a semicircular swelled-out chute 22 that is about three quarters of the way up the wall and runs lengthwise down the side of the left wall 14 and across the back wall 18.

Positioned on the back wall 18, below the swelled-out semicircular area 22, is a perforated, trough-shaped, wire mesh separator 24 that runs the length of the back wall 18. This separator 24 leads to an open hole 26 in the right wall 16, so that when the litter box 10 is tilted to the right, any item in the separator 24 would roll along and fall out of this hole 26 in the wall 16.

Figure 10:
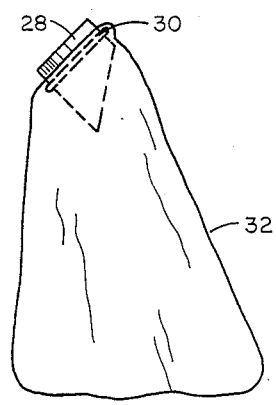
FIG. 10 is a perspective view noting the position of the disposable solid pet excrement receptacle bag as would be observed in FIG. 9.
Figure 11:
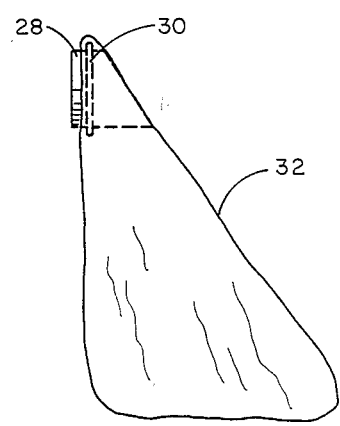
FIG. 11 is a perspective view noting the position of the disposable solid pet excrement receptacle bag as would be observed in FIG. 4 and displaying the ability of the receptacle bag to seal itself off and thereby contain any offensive odor that may be given off from the solid pet excrement now located within the bag.

Surrounding this opening 26 on the outside of the right wall 16 is a tubular shaped protrusion 28. This tube 28 has a raised ring 30 around the middle of it to aid in the securing of a disposable bag 32 over the end of the tube 28. The end of the tube 28 is cut off at a 45 degree angle. When a bag containing pet feces is attached to the tube 28, the weight of the bag 32 would cause it to seal-off against the angled end and prevent the escape of undesirable odors. See FIGS. 10 and 11 for the operation of the tube 28 and bag 32.

Positioned in the top of this unique litter box 10, is a handle 34 for easy lifting of the box 10. There would also be a similar handle 36 located in the middle of the outside right wall 16. This second handle 36 would assist in the rotating of the litter box 10.

OPERATION

In the normal use of the pet litter box 10, there would be 1-2 inches of absorbent material 38, referred to previously as pet litter, deposited in the bottom of the box, as shown in FIG. 5. After the litter box is repeatedly used by the pet, there will also be numerous solid excrement 40 mixed in with the litter 38. Wishing to separate and remove the solid pet excrement from the still usable absorbent litter material, the box owner will undertake the following operations, as shown in FIGS. 6-9.

The operator, while facing the opening 20 at the front, will lift the box 10 by the top handle 34 with the left hand and secure the right hand to the handle 36 on the right side. By rotating the entire box to the left, the litter 38 and pet droppings 40 will be moved up the left side wall 14 and be deposited into the semicircular swelled-out chute 22 located up the left wall.

While still leaning the litter box to the left, the operator will then rotate the box backward. This rotating action will now cause the litter and pet droppings mixture to flow along through the chute 22. Since the box is now leaning backwards, the mixture will be located along the back wall 18 and above the perforated, trough-shaped wire mesh separator 24 that runs along the back wall.

At this point, the operator will rotate the box forward and return it to a level position. This action will cause the litter 38 and pet droppings 40 mixture to fall from the chute 22 in the back wall 18 and slide down the wall into the perforated, trough-shaped, wire mesh separator 24. The perforations in the mesh are sized such that the smaller absorbent litter material will fall readily through while the larger solid pet excrement will remain in the separator.

The operator will now rotate the litter box to the right. This will cause the pet droppings located in the trough 24 to roll along to the hole 26 cut in the right wall 16 at the end of the trough. The droppings will then fall through the wall and into the bag 32 that is attached to the tube 28 surrounding the hole 26 in the wall 16.

Returning the box 10 to the level position will enable the now clean litter 38 to cover the bottom of the box once again. In the level position, the bag 32 containing the solid pet excrement 40 will return to being in direct contact with the angled end of the tube 28 it is attached to. The bag will be sealed off, thus preventing any undesirable odors from escaping.

At this point the operator can remove the disposable bag 32 and discard it. The operator may choose to clean the litter box several times in the above described manner before actually discarding the bag since the pet droppings and the undesirable odors are sealed off in the bag. An opaque bag cover 42 is also attached to the tube, entirely covering the tube and the disposable bag, thus preventing any visual contact with the pet droppings as shown in FIG. 5.

The operation described above, illustrates the simplicity of the litter box cleaning process. It also clearly demonstrates how this device accomplishes all the previously mentioned goals and objectives that are desirable in a self-cleaning pet litter box.

I claim:

1. An animal litter box comprising:
   a generally rectangular container having an inperforate bottom adapted to receive and contain absorbent animal litter material and excrement thereon, a top, and four side walls extending from the bottom to the top of said container, one of said side walls having an opening therein to permit ingress and egress of an animal;
   a perforate, trough-shaped wire mesh separator attached to a side wall opposite said side wall having an opening therein;
   an opening in and a tube-shaped protrusion extending from a side wall adjacent said side wall having a wire mesh separator attached thereto, said opening and tube-shaped protrusion being aligned with said wire mesh separator; and
   a disposable bag removably attached to said tube-shaped protrusion for the temporary storage of animal excrement.

2. The animal litter box of claim 1 further comprising a swelled-out semicircular chute extending along the length of the side wall opposite the side wall having an opening and tube-shaped protrusion, said chute conjoining a second swelled-out semicircular chute extending along the length of said side wall to which said wire mesh separator is attached.

3. The animal litter box of claim 2 wherein said wire separator is attached along the length of said side wall.

4. The animal litter box of claim 1 further comprising a handle attached to the top center of said container.

5. The animal litter box of claim 4 further comprising a second handle attached to said side wall having an opening and tube-shaped protrusion.

6. The animal litter box of claim 1 wherein the end of said tube-shaped protrusion extending from said container is cut off at a forty-five degree angle, where the weight of said disposable bag retains said bag against said cut angle thus sealing said tube-shaped protrusion and preventing the escape of odors.

7. The animal litter box of claim 1 and including an opaque bag cover to prevent direct visual contact with the animal excrement.

* * * * *